UNITED STATES PATENT OFFICE.

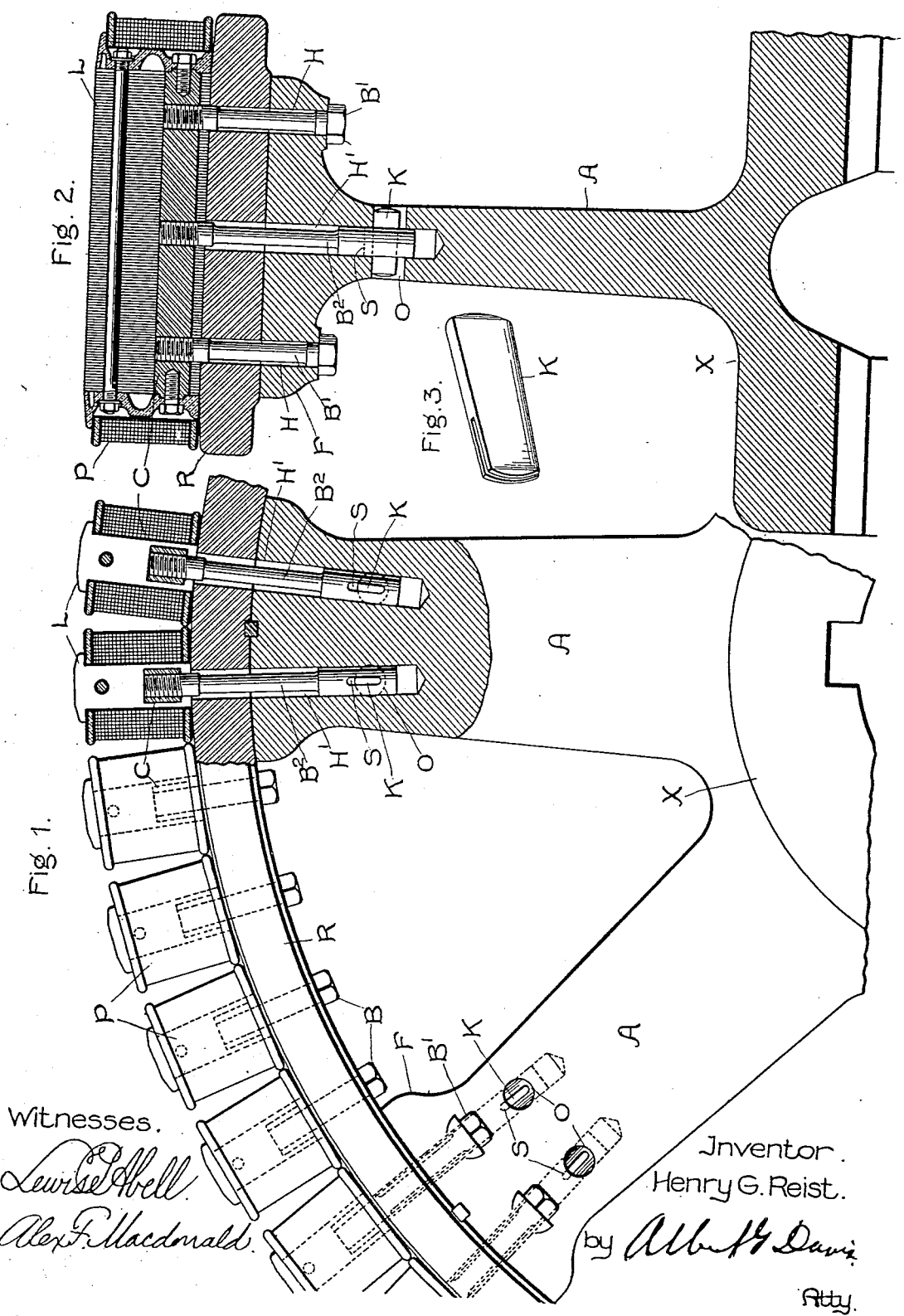

HENRY G. REIST, OF SCHENECTADY, NEW YORK, ASSIGNOR TO THE GENERAL ELECTRIC COMPANY, OF NEW YORK.

MEANS FOR SECURING POLE-PIECES.

SPECIFICATION forming part of Letters Patent No. 676,276, dated June 11, 1901.

Application filed January 29, 1900. Serial No. 3,129. (No model.)

*To all whom it may concern:*

Be it known that I, HENRY G. REIST, a citizen of the United States, residing at Schenectady, county of Schenectady, State of New York, have invented certain new and useful Improvements in Means for Securing Pole-Pieces, (Case No. 1,184,) of which the following is a specification.

This invention relates to electric machines; and it consists of means for attaching pole-pieces to the same.

Figure 1 is an elevation, partly in section, showing an application of my invention to a rotatable field structure. Fig. 2 is a transverse section of the part shown in section in Fig. 1, and Fig. 3 is a detail in perspective of the key shown in Fig. 2.

A rotatable field structure is represented by X. This may be provided, as shown, with arms A, on the ends of which a ring R is mounted in any suitable manner; but the invention is not limited in its application to the illustrated structure. Pole-pieces P, which may be formed with laminations L, having a securing-piece or retaining-bar C, are attached to the structure X by bolts B, which pass through the ring R and are seated in the securing-piece C. The invention is applicable, however, to pole-pieces of other structures. The arms A are formed with flaring ends F, and the pole-pieces opposite the ends of the arms are secured by bolts B', which pass through holes H in the flaring ends of the arms. A further means of securing the pole-pieces opposite the arms A consists of the following construction: The arms A are formed with radial holes H' and transverse slots O, which cross the holes H'. Bolts B², which pass through holes in the ring R, are secured to the pole-pieces in any suitable manner, as in the securing-piece C, and these bolts are provided with slots S at the portion where they pass through transverse slots O. These slots S extend a short distance above the outer walls of the transverse slots O, and a tapered key K is inserted in the transverse slots O and is driven through the slots S of the bolt, so that the latter is drawn radially toward the center of the structure. The tapered key K is cut centrally along its length from one end, and after the key is forced into the slot S the ends of the key are wedged apart to prevent the key from being jarred out. The key K is preferably made of steel, and the central cut may be made by sawing or in any other suitable manner.

The above-described means may be used to attach the pole-pieces to any other suitable field structure or to a suitably-constructed armature, if that be desired.

What I claim as new, and desire to secure by Letters Patent of the United States, is—

1. The combination with a rotatable field structure, which is provided with radial holes, and slots transverse to the holes, of pole-pieces, bolts in the holes and secured to the pole-pieces, and slotted where they cross the transverse slots, and keys in the transverse slots extending through the slots and the bolts.

2. The combination with a rotatable field structure, which is provided with radial holes, and slots transverse to the holes, of pole-pieces, bolts in the holes secured to the pole-pieces, slots in the bolts where they cross the transverse slots, and extending above said transverse slots, and tapered keys adapted to be forced into the transverse slots through the slots of the bolts.

3. The combination with a rotatable field structure, which is provided with radial holes, and slots transverse to the holes, and bolts in the holes secured to the pole-pieces, slots in the bolts where they cross the transverse slots, and keys having one end cut longitudinally, extending through the transverse slots and the slots in the bolts.

4. The combination with a rotatable field-spider, having radial holes formed in the ends of its arms, of a pole-piece, a bolt in the hole, secured to the pole-piece at its outer end, and to the spider-arm at its end in the hole.

5. The combination with a member of an electric machine, having radial holes open only at one end, of pole-pieces, and bolts in the holes, secured at their outer ends to the pole-pieces, and at their inner ends in the holes to said member.

6. The combination with a rotatable field structure formed with radial holes open at only one end, of laminated pole-pieces each provided with a retaining-bar, and bolts secured at their outer ends to said bars and at their inner ends in said holes.

7. The combination with a rotatable field structure formed with radial holes, of laminated pole-pieces each provided with a retaining-bar, bolts in said radial holes and seated in said bars, and keys for securing said bolts in the radial holes.

In witness whereof I have hereunto set my hand this 27th day of January, 1900.

HENRY G. REIST.

Witnesses:
BENJAMIN B. HULL,
MABEL E. JACOBSON.